United States Patent [19]

Thibault

[11] 4,242,025

[45] Dec. 30, 1980

[54] PALETTIZING-DEPALETTIZING APPARATUS

[76] Inventor: Jacques G. A. Thibault, 35, rue Robert Legeay, 94000 Creteil, France

[21] Appl. No.: 922,418

[22] Filed: Jul. 6, 1978

[30] Foreign Application Priority Data

Jul. 8, 1977 [FR] France .................................. 77 21226

[51] Int. Cl.³ .............................................. B65G 57/04
[52] U.S. Cl. ........................................ 414/70; 414/72; 414/752; 414/84
[58] Field of Search ...................... 414/62, 70, 71, 72, 414/84, 750, 752, 120, 121; 294/67 A, 67 AA, 67 AB

[56] References Cited

U.S. PATENT DOCUMENTS

| 3,697,112 | 10/1972 | Nielson et al. | 294/65 |
| 3,884,363 | 5/1975 | Ajlouny | 294/103 R X |
| 4,005,782 | 2/1977 | Crockett | 415/750 |
| 4,055,261 | 10/1977 | Schneider | 271/84 X |

FOREIGN PATENT DOCUMENTS

| 2620535 | 11/1977 | Fed. Rep. of Germany | 414/62 |
| 1395649 | 3/1965 | France | 414/56 |
| 1447434 | 6/1966 | France . | |
| 1052051 | 12/1966 | United Kingdom . | |

Primary Examiner—L. J. Paperner
Attorney, Agent, or Firm—Karl W. Flocks

[57] ABSTRACT

The palettizing apparatus of the crane-hoist type, comprises a support; at least one vertical hoist pillar sliding horizontally on said support; and a horizontal hoist arm sliding vertically with respect to said vertical pillar. A carriage slides horizontally with respect to said arm, and an article gripping head is mounted on said carriage. A member ensures the rotation of said head with respect to said carriage. The gripping head can comprise suction means.

4 Claims, 4 Drawing Figures

PALETTIZING-DEPALETTIZING APPARATUS

The present invention relates to a palettising-depalettising apparatus of the crane hoist type enabling packages to be loaded onto a support designed for handling or for storage.

Generally, the invention is directed to a palettising apparatus characterized in that it comprises at least one arm perpendicular to a plane and moving in this plane, combined with a package-gripping head so that the head moves along the longitudinal axis of the arm. This head can grip at least one package.

This type of apparatus has the function of taking a package or a small group of packages constituting an amount equivalent at the most to a row of packages (a row being the set of packages constituting either a length, or a width of the palette), several rows constituting a layer. To make a geometrical image, the package may be associated with a point, the row with a line, the layer with an area and the palette with a volume, and they can be arranged to constitute thereof a set which is called "paletted" which can be constituted with or without a support.

According to one embodiment, this gripping head comprises suckers.

According to another embodiment, this gripping head is provided with a fork.

The apparatus according to the invention comprises, in addition, an automatization unit constituted by a programming matrix, sets of bars ensuring interchangeable and variable programs and an electrical box grouping the servo-control systems of the various movements.

Other advantages and characteristics of the invention will emerge from the description which follows given with reference to the accompanying drawings, in which.

The palettising-depalettising apparatus of the crane-hoist type according to the invention permits the production of a load formed of elementary loads which are similar or different having, in bulk, a parallelepipedic shape.

Figure 1:
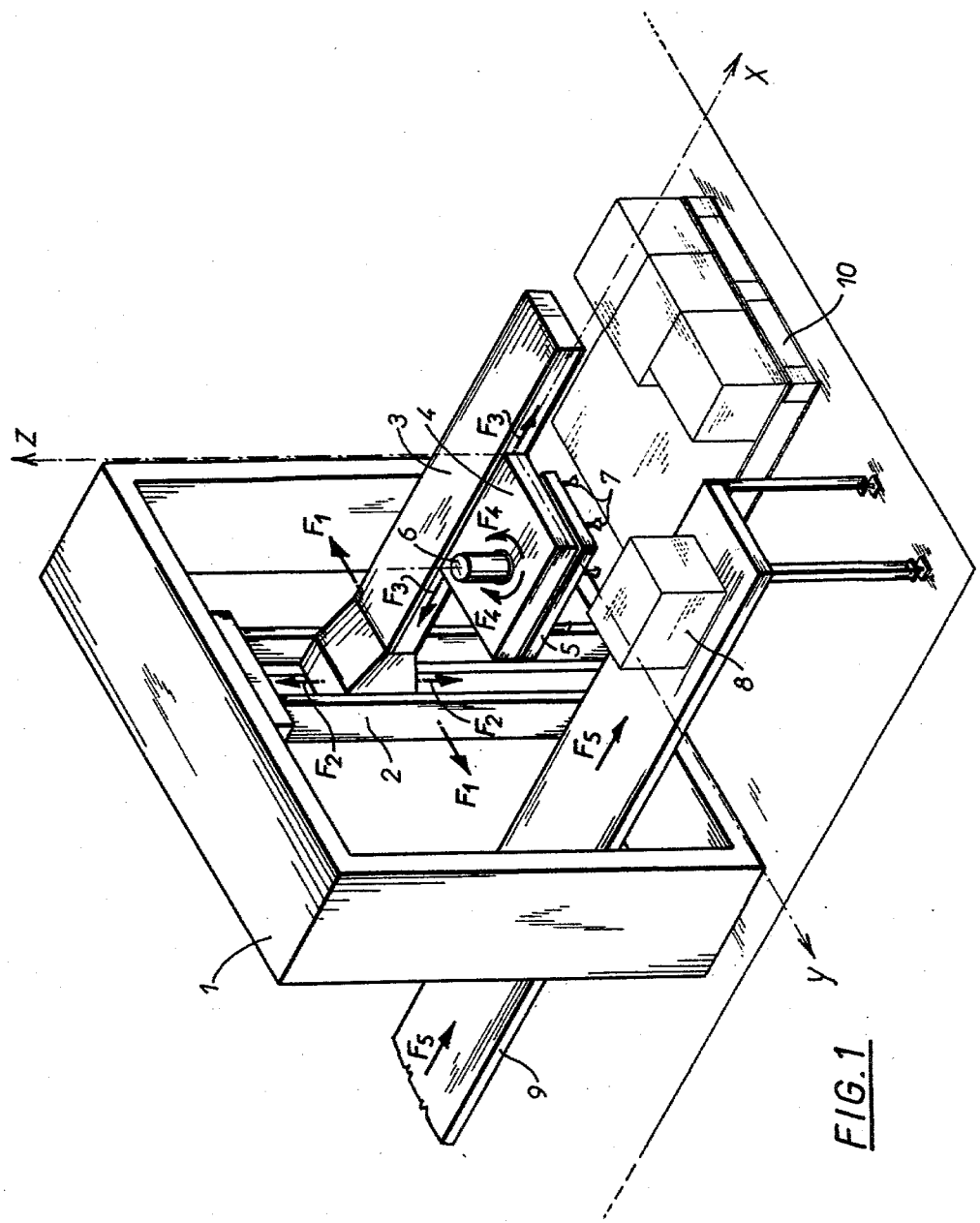
FIG. 1 shows, in perspective, the whole of a palettising apparatus according to the invention, in accordance with a first embodiment.

As shown in FIG. 1, the apparatus according to the invention comprises essentially a frame 1 of sectional elements of a modular nature, a crane-hoist pillar in the form of a vertical frame 2, sliding horizontally (arrows $F_1$) in the frame 1, a horizontal crane-hoist arm 3 sliding vertically (arrows $F_2$) with respect to the frame 2, a carriage 4 sliding horizontally (arrows $F_3$) with respect to the arm 3, an article-gripping head 5 and a member 6 ensuring the rotation (arrows $F_4$) of the head 5 with respect to the carriage 4 around an axle parallel to the direction $F_2$ of the sliding of the arm 3, hence vertical.

The gripping head 5 is of the sucker type (see suckers 7). Other suction devices may be provided, for example a vacuum producing apparatus.

The apparatus comprises, in addition, as indicated above, an automatization unit (not shown).

The operation of this apparatus is as follows:

The articles of parallelepipedic shape arrive (arrows $F_5$) at the position 8, below the gripping head 5, on a supply transporter 9, comprising, for example, a roller table with notches to take the articles which must arrive one-by-one and without thrust, this table being at about 60 cm from the ground, a level compatible with the requirements of packaging.

Each article, at its arrival below the gripping head, is seized by the suckers 7 and then subjected to the movements corresponding to the four degrees of liberty of the apparatus (indicated by the arrows $F_1$, $F_2$, $F_3$ and $F_4$) and deposited, according to the programmed cycle, at the place corresponding to its position in the palette 10.

Figure 2:
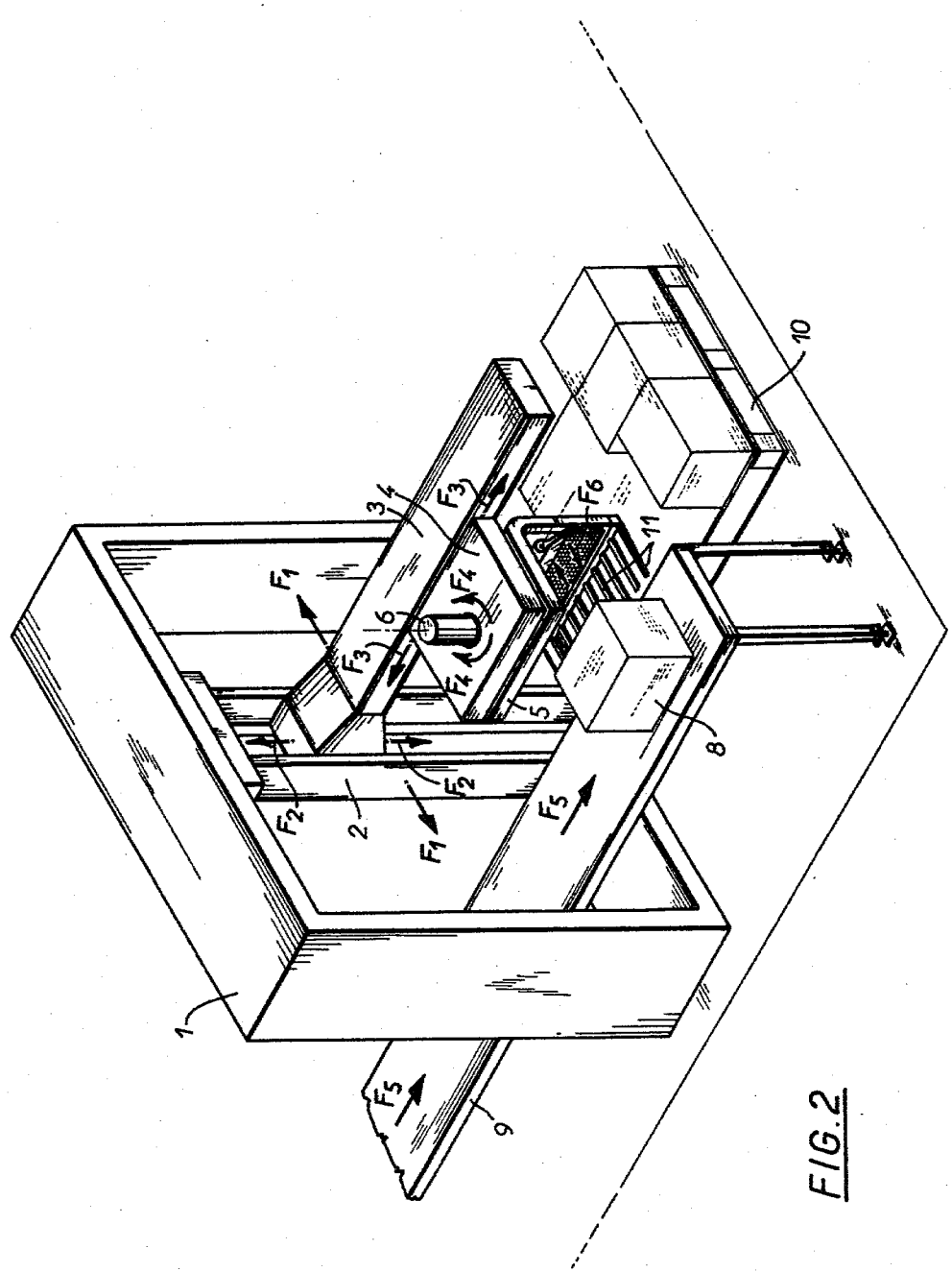
FIG. 2 is a view similar to that of FIG. 1, from which it only differs by the gripping head which, instead of being of the sucker type, is of the fork type.

The operation of the modification of the apparatus shown in FIG. 2 only differs from the operation described above by the fact that each article is gripped not by suckers, but by forks 11 capable of a withdrawal movement (arrows $F_6$).

The gripping head 5 may, of course, serve to take also palettes or intercalary sheets, for example, of cardboard, or any device serving for preparing the load.

The frame 1 of the apparatus according to the invention may be designed, on the one hand, so as to permit the loading of several palettes 10 simultaneously or successively and, on the other hand, to permit the arrangement side-by-side of several apparatus according to the invention.

In fact, it is well understood that the various movements indicated by the arrows $F_1$ to $F_5$ are reversible and that, consequently, the apparatus according to the invention can serve not only for stacking the articles, but also for unstacking them.

Figure 3:
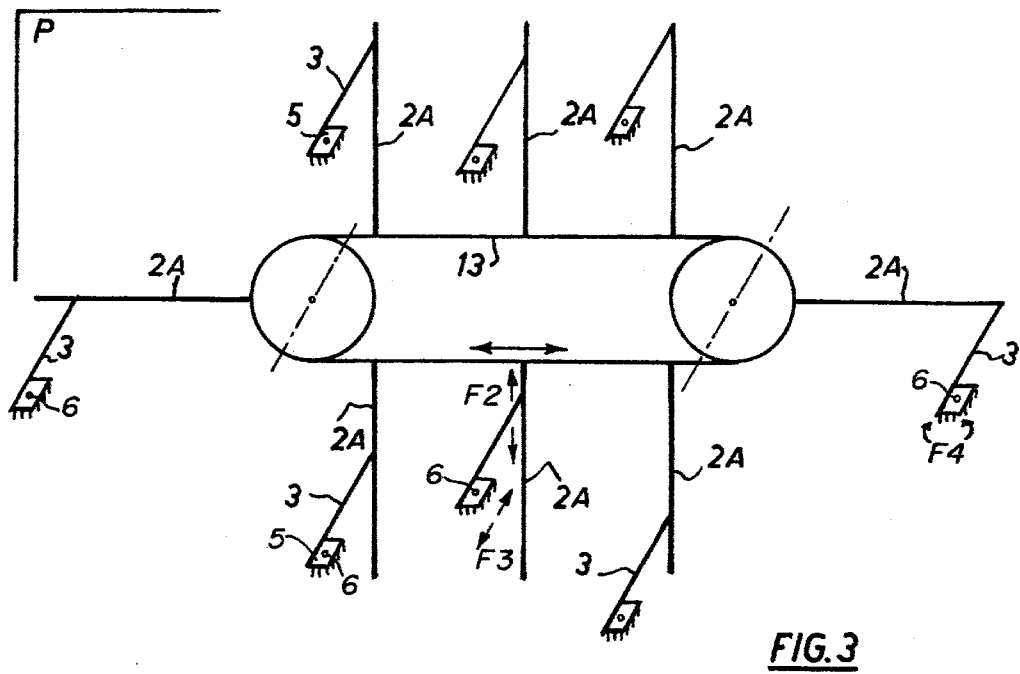
FIGS. 3 and 4 are diagrammatic perspective views of modifications.
Figure 4:
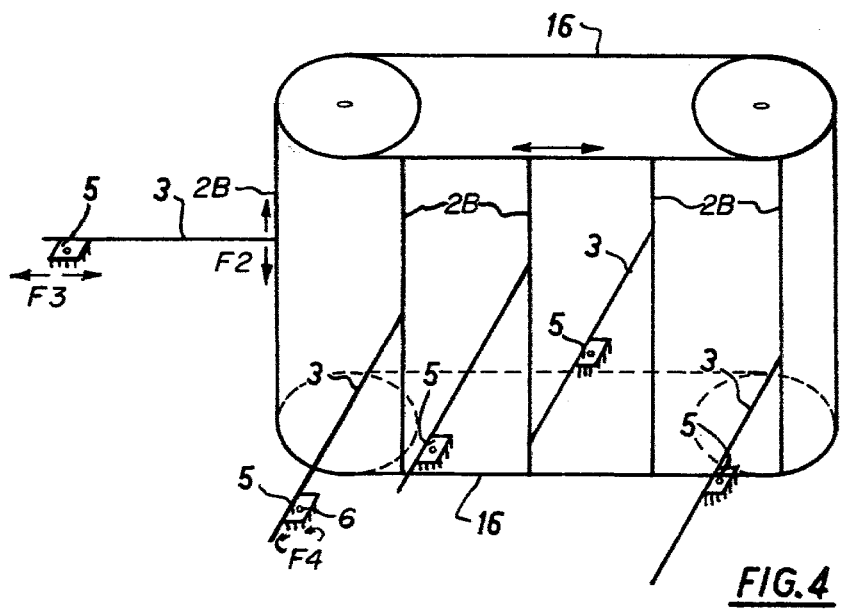

Going further, it is possible to envisage an apparatus with several arms or several heads, forming a closed circuit, either in a vertical plane, or in a horizontal plane, as indicated in the modifications of FIGS. 3 and 4.

FIG. 3 shows an embodiment in which several arms 3 are provided and move in a vertical plane P. Each of these arms is supported by a vertical frame 2A which slides with an endless chain 13.

In the embodiment shown in FIG. 4, several arms 3 are provided and move in a curved surface 14. The arms 3 are supported by vertical frames 2B which slide with two endless chains 16.

I claim:

1. Apparatus for palettising or depalettising articles of parallelepipedic shape at the place or from the place corresponding to their position on the palette, said apparatus being of the crane hoist type and comprising in combination:
   (a) a support having generally horizontal upper and lower surfaces;
   (b) at least one vertically extending hoist pillar having upper and lower ends assembled on said support in horizontally slideable relationship with said upper and lower surfaces of said support;
   (c) a hoist arm extending horizontally from said pillar in vertically slideable relationship therewith in a direction normal to the direction of movement of said pillar;
   (d) a carriage extending from one side of said hoist arm in horizontally slideable relationship with said hoist arm;
   (e) an article gripping head mounted on said carriage;
   (f) means facilitating and ensuring rotation of said head with respect to said carriage; and (g) means for effecting automation in operation of said apparatus.

2. Apparatus according to claim 1, wherein said gripping head comprises suction means.

3. Apparatus according to claim 1, wherein said gripping head comprises forks with a withdrawal motion.

4. Apparatus according to claim 1, comprising a transporter for moving articles beneath the gripping head.

* * * * *